(12) United States Patent
Coxsey

(10) Patent No.: US 6,314,647 B1
(45) Date of Patent: Nov. 13, 2001

(54) ONE-HANDED BRANCH-CUTTING DEVICE

(75) Inventor: Joe Bryant Coxsey, Poway, CA (US)

(73) Assignee: Arcoa Industries, Escondido, CA (US)

( * ) Notice: Subject to any disclaimer, the term of this patent is extended or adjusted under 35 U.S.C. 154(b) by 0 days.

(21) Appl. No.: 09/542,134

(22) Filed: Apr. 4, 2000

Related U.S. Application Data

(63) Continuation-in-part of application No. 09/323,238, filed on Jun. 1, 1999, now abandoned.

(51) Int. Cl.$^7$ .................................................. B26B 13/26
(52) U.S. Cl. .................................. 30/188; 30/92; 30/134; 30/135; 30/190
(58) Field of Search ............................... 30/92, 180, 186, 30/187, 188, 249, 251, 134, 190

(56) References Cited

U.S. PATENT DOCUMENTS

| | | | | |
|---|---|---|---|---|
| 406,524 | * | 7/1889 | Jennings | 30/135 |
| 530,221 | * | 12/1894 | Effinger et al. | 30/188 |
| 1,181,223 | * | 5/1916 | Holm | 30/188 |
| 2,602,994 | * | 7/1952 | McGray | 30/251 |
| 2,714,250 | * | 8/1955 | Twedt | 30/180 |
| 2,994,954 | * | 8/1961 | Thompson | 30/251 |
| 3,117,578 | * | 1/1964 | Helbling | 30/188 |
| 3,138,869 | * | 6/1964 | Parhaniemi | 30/180 |
| 3,772,783 | * | 11/1973 | Averitt | 30/186 |
| 3,834,215 | * | 9/1974 | Lemley | 30/180 |
| 4,198,748 | * | 4/1980 | Lewis | 30/180 |
| 5,070,616 | * | 12/1991 | Chen | 30/92 |
| 5,117,557 | * | 6/1992 | Hartley | 30/134 |
| 5,471,745 | * | 12/1995 | Wendell | 30/134 |
| 5,556,407 | * | 9/1996 | Wurster et al. | 30/134 |

* cited by examiner

*Primary Examiner*—Hwei-Siu Payer
(74) *Attorney, Agent, or Firm*—John J. Murphey

(57) ABSTRACT

Finger-actuated device for cutting slender articles at a distance, including a first end including an anvil and a cutting edge articulated about a common axis and arranged to temporarily accept a slender article therebetween, a second end including a handle and a finger-actuated trigger, an elongated rigid shaft holding the first end remote to the second end and, means actuated by the finger-actuated trigger along the shaft to cause the cutting edge to pivot forcibly into contact with the anvil.

5 Claims, 6 Drawing Sheets

ONE-HANDED BRANCH-CUTTING DEVICE

RELATION TO OTHER APPLICATIONS

This application is a continuation-in-part of my previously filed patent application titled "ONE-HANDED BRANCH-CUTTING DEVICE", filed Jun. 1, 1999 and assigned Ser. No. 09/323,238, now abandoned.

BACKGROUND OF THE INVENTION

1. Field of the Invention

This invention pertains to devices for cutting slender articles at a distance from the operator using one hand to move the entire device about, begin the cutting operation, perform the cutting operation, and withdrawing the entire device from the cutting area. More particularly, this invention relates to a branch-cutter or bush-cutter that is operated by a one-handed pistol-grip type handle-trigger mechanism at one end of the device and a pair of articulated jaws carrying an anvil and cutting edge located distantly at the other end of the device.

2. Description of the Prior art

Branches never seem to grow in the right location or in the correct direction. Unless the tree or bush is of the hemlock type, where the branches always grow upward against the trunk, many home-owners, landscapers and gardeners are faced with the task of cutting branches in an effort to trim the tree or bush and force the growth into a direction that will eventually produce a better looking flora.

There are many ways to trim the branches of a tree or bush. For instance, one can literally climb the tree and position themselves on the branch to be cut and then saw the branch off the tree. In this example it is important to remember to sit on the part of the branch that will be left on the tree after the sawing if completed. Otherwise, the operator may fall with the branch and be injured. There are branch cutters on the market that may be used in place of actually climbing the tree.

Another situation occurs with cutting branches and that is that following completion of the cutting operation, and depending on the location and overall weight of the branch just cut, the cut branch often falls from its pre-cut position and must be extracted, usually by the operator sticking their hand into the area of the cut and grasping and pulling the cut branch out of the tree or bush. While this appears to be a minor operation, those who have trimmed rose bushes and other prickly or thorn-covered trees and bushes knows of the hazard posed by sticking one's arms into the tree or bush to grasp the cut branch. In addition, it is quite important for the device to be entirely moved and operated with one hand as many users require the other hand to steady themselves on a ladder, scaffolding, or other structure. Requiring two hands to perform the cutting operation would add a substantial risk factor to branch cutting.

One of these devices includes a long staff with a pair of cutting jaws located at the distant end where the jaws are biased apart by a spring and one jaw is rendered pivotally moveable toward the other, the movement generated by a long rope that is attached at one end to the moveable blade and brought along the long staff through loose loops attached therealong so that the operator holds the long staff with one hand and pulls on the rope with the other hand to force the cutting edges together after the branch is guided in between the jaws. This device takes two hands and is very hard to use by people who do not have much strength in their hands and arms.

Another device is shown in U.S. Pat. No. 97,996 wherein a pair of scissor handles are combined with a pair of articulated cutter-jaw and anvil jaw elements to allow one to cut small items by squeezing together the handle elements in a scissor-like operation. It should be noted that this device is of necessity very short in overall length as the scissor handle elements would have to continue to divert from each other if the instrument were made much longer so that, at a distance of say ten feet in overall length, the loops at the end of the handles of the scissor elements would be maybe four to five feet apart so that no single hand could operate the two elements as shown in the patent drawings.

Still another device is shown in U.S. Pat. No. 5,673,487 where another pair of diverging handles extends from an axis that articulates a pair of pivotally hinged jaws wherein each jaw carries either a replaceable anvil or a replaceable cutting blade to cut slender articles placed therebetween. This device likewise is limited to a short length because the diverging handles that need to be pinched together continually diverge and, at a long enough length, will diverge so much that one person would have trouble operating the device with one hand let alone two hands.

A still further piece of prior art is shown in U.S. Pat. No. 2,602,994 wherein an elongated shaft is interconnected a squeezable handle and a pivotal head for drawing a cable or other slender device against a fixed cutting head. While this device appears to be a cutter for slender articles, it is really a cutter for steel and other metal cables and utilizes a system that brings the article against an immoveable cutting edge instead of causing a cutting edge to move against the article while supported on an anvil. It also requires both hands to operate the device.

What is needed therefore, is a cutting device for articles that may be made in different lengths and not be limited to such a short distance so that the device could be used to reach very long distances to cut branches and the like located on the upper reaches of a tree or large bush. In addition, there is needed a device that can be moved, operated and withdrawn from the cutting area with one hand and to temporarily grasp the cut branch in the same operation so that it can be pulled from the tree or bush without requiring the user to reach in and grab the cut branch and possibly puncturing himself or herself with thorns in the process. The device needs to be lightweight so that the operator can use their other hand to steady themselves, and to move other, not-to-be-cut branches and the like away from the handle for easier use of the device. To do this, however, requires a device that possesses a large mechanical advantage so that one hand will have enough strength to operate the device and make the appropriate cut without undue strain on the fingers, hand, or forearm.

SUMMARY OF THE INVENTION

This invention is a one-handed tree limb or branch cutter that may be used by virtually anyone owing to its great mechanical advantage. The device can be made in various lengths and has a pistol grip-type handle at one end in association with a multi-finder-squeezable trigger, and a pair of jaws at the other end, one immoveable jaw holding an anvil and the other jaw holding a cutting blade with a cutting edge that is articulated in pivotal arrangement about a single axis. A non-stretchable tape or strap, such as a length of steel strap passes from the finger-squeezable trigger along or inside a non-flexible shaft that separates the handle from the jaws to be pulled by the trigger and pulls the cutting edged jaw to pivot and close over and cut a branch temporarily held between the anvil and the cutting edge.

More accurately, the invention is a multi-finger-actuated device for cutting slender articles at a distance, comprising a first end including a fixed anvil and a cutting edge articulated about an axis and arranged to temporarily accept a slender article therebetween, a second end including a handle and a multi-finger-actuated trigger, an elongated stiff shaft holding the first end rigidly remote to the second end, and non-stretchable strap means actuated by said multi-finger-actuated trigger along the shaft to undergo tension during the trigger squeezing operation and cause the cutting edge to pivot forcibly into contact with the anvil in a cutting movement. In another embodiment of this invention, an element is provided in combination with the cutting edge and the anvil for temporarily pinching and holding the cut branch or other article adjacent the anvil and cutting edge following completion of the cutting operation.

The main object of this invention is an extended device for trimming branches and other slender objects at a distance from the operative handle; a device for trimming branches of pricker bushes that would otherwise pose a serious hazard to fingers, hands and arms of the user who reaches in such dangerous areas to cut the branches; a device that allows cutting of a branch or limb at a distance from the flora in order to separate one's self from potentially dangerous areas occupied by Africanized bees and/or other dangerous insects; a device that operates with one hand as opposed to two hands presently existing in the prior art and that can be inserted into a bush or tree at one opening so that two diverging handles (such as in the prior art) need not be inserted into the area to become entangled therein during maneuvering of the cutting handles; a device having a replaceable cutting edge and a replaceable anvil to maintain the trimming ability of the device in peak operable condition; a device that may be made in a variety of lengths to suit the purposes of a wide range of homeowners, gardeners and landscapers; a device that is simple to operate so that it is useable by a wide diversity of persons; a device that incorporates a large mechanical advantage, owing to the separate and additive mechanical advantages located both in the handle and in the cutting jaws; a device that uses common replaceable cutting blades that are found throughout the industry for a variety of other purposes; and a device that is sturdily built for long life.

These and other objects will become more apparent when reading the subsequent Description of the Preferred Embodiment taken together with the drawings appended hereto. The scope of protection desired by the inventor may be gleaned from a fair reading of the claims that conclude this Specification.

DESCRIPTION OF THE PREFERRED EMBODIMENT

Figure 1:
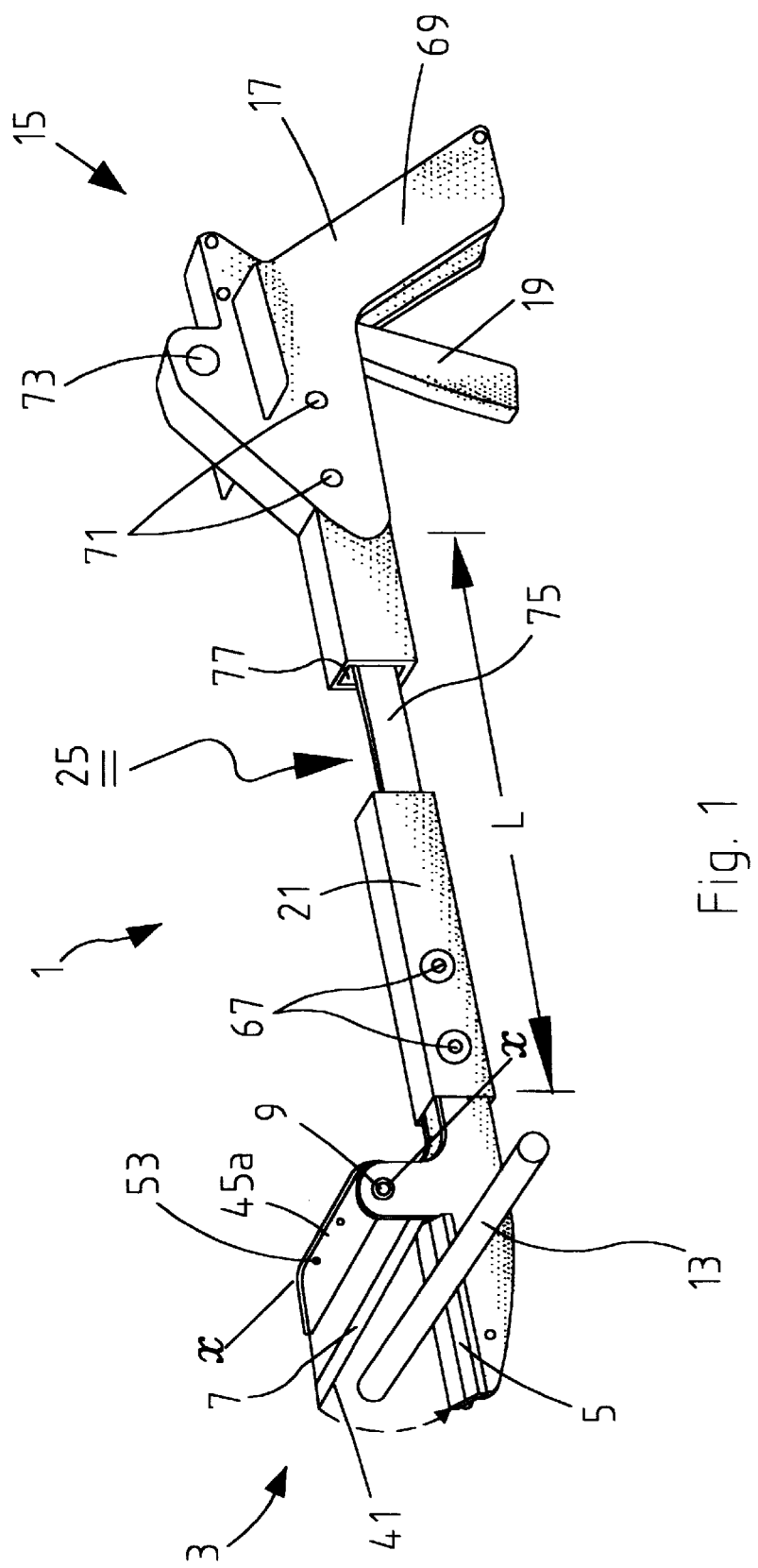
FIG. 1 is a perspective view of the preferred embodiment of this invention.

Turning now to the drawings wherein elements are identified with numerals and like elements are identified with like numerals throughout the eight figures, FIG. 1 shows the preferred embodiment of the invention and shows a finger-actuated device 1 for cutting slender articles, such as tree branches at a distance "L" from the operator and shows a first end 3 including a wide anvil 5 and a cutting edge 7 wherein said cutting edge is articulated about an axis x-x and axial pin 9 and arranged in open position as shown to temporarily accept a slender article or branch 13 therebetween. A second end 15 is provided including a handle 17 and a multi-finger-actuated trigger 19 pivotally attached thereto. An elongated stiff shaft 21 is provided to hold first end 3 rigidly remote from second end 15. Means 25 is provided to force cutting edge 7 against anvil 5, when trigger 19 is squeezed against handle 17, and cut branch 13. As can be readily seen in FIG. 1, means 25 goes into tension when trigger 19 is squeezed against handle 17, pulling means 25 rearward and forcing cutting edge 7 down toward anvil 5.

Figure 2:
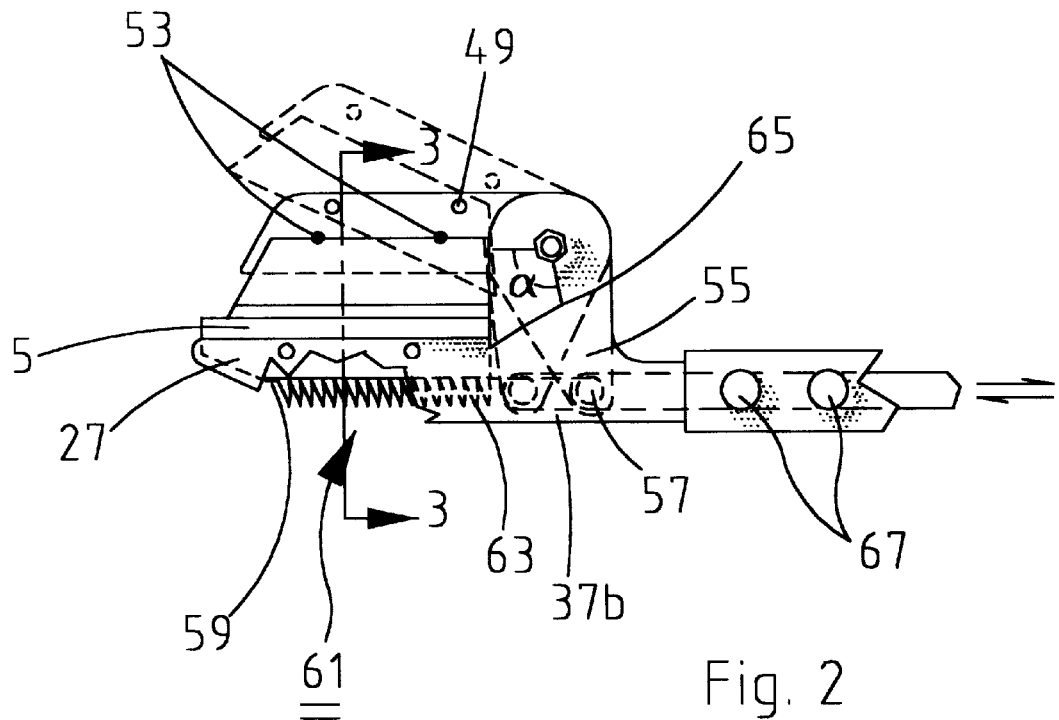
FIG. 2 is a close-up view of the cutting edge and anvil parts of the invention.
Figure 3:
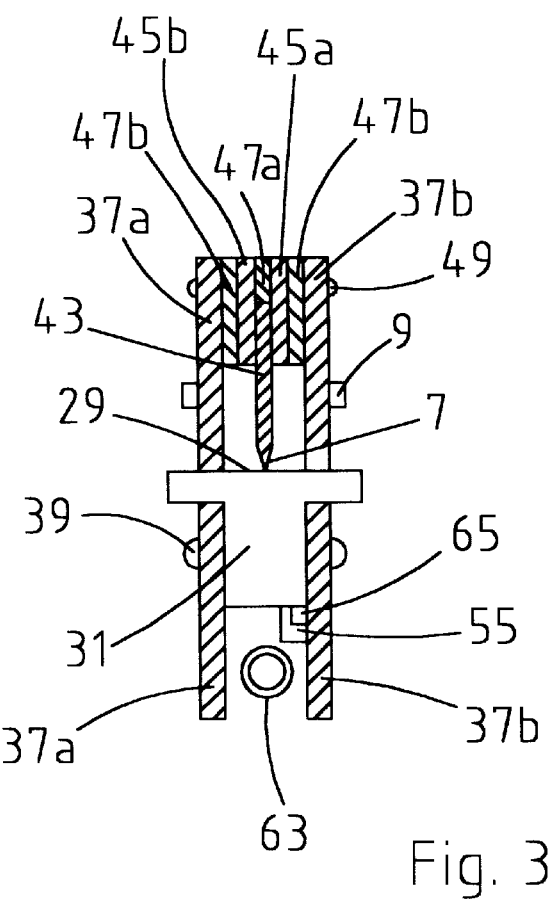
FIG. 3 is an end sectional view of the replaceable cutting blade end of this invention taken along lines 3—3 in FIG. 2.
Figure 4:
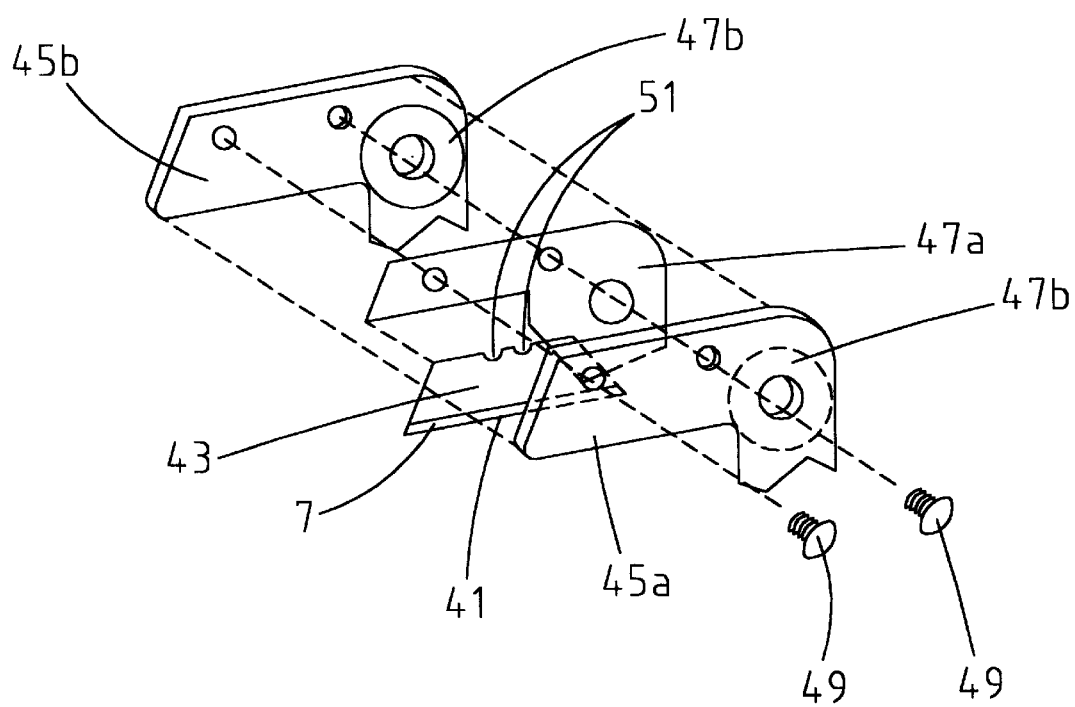
FIG. 4 is a close-up view of the replaceable cutting edge part of this invention.
Figure 5:
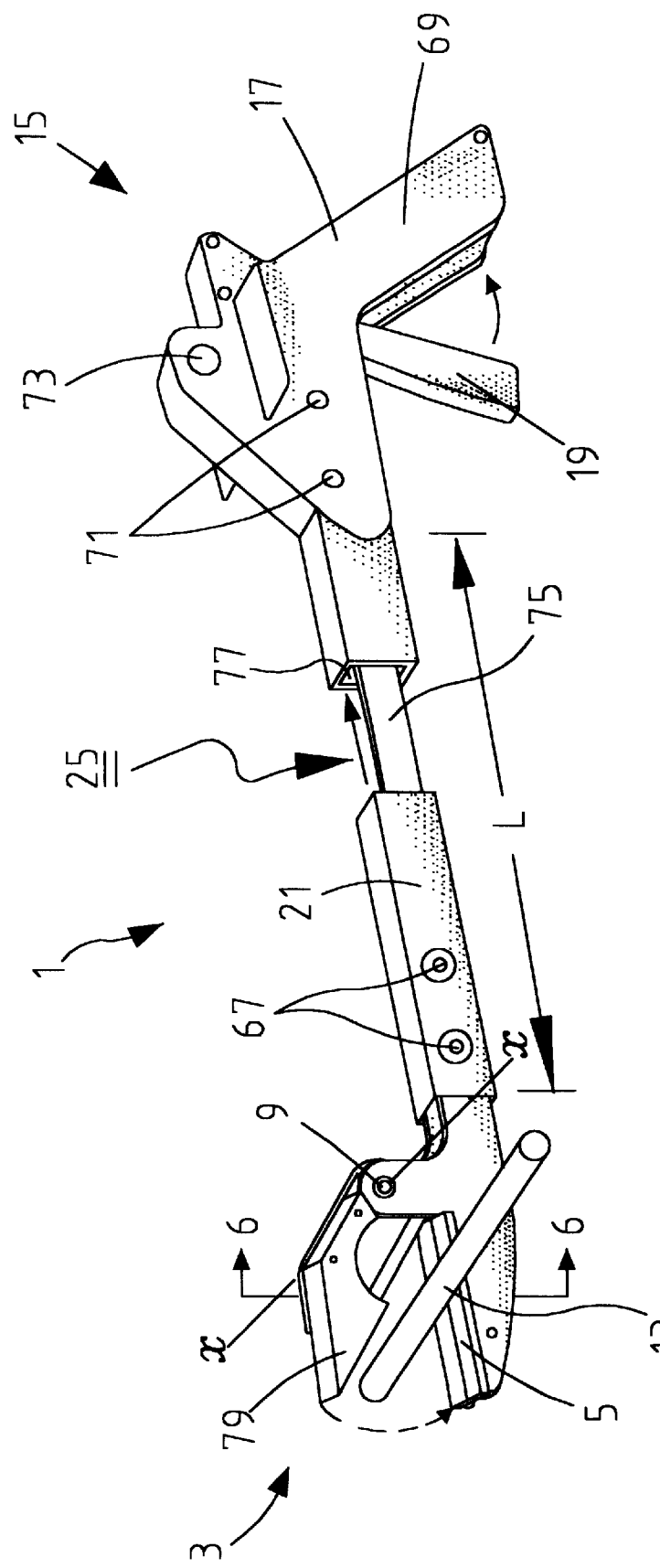
FIG. 5 is a perspective view of another embodiment of this invention.
Figure 6:
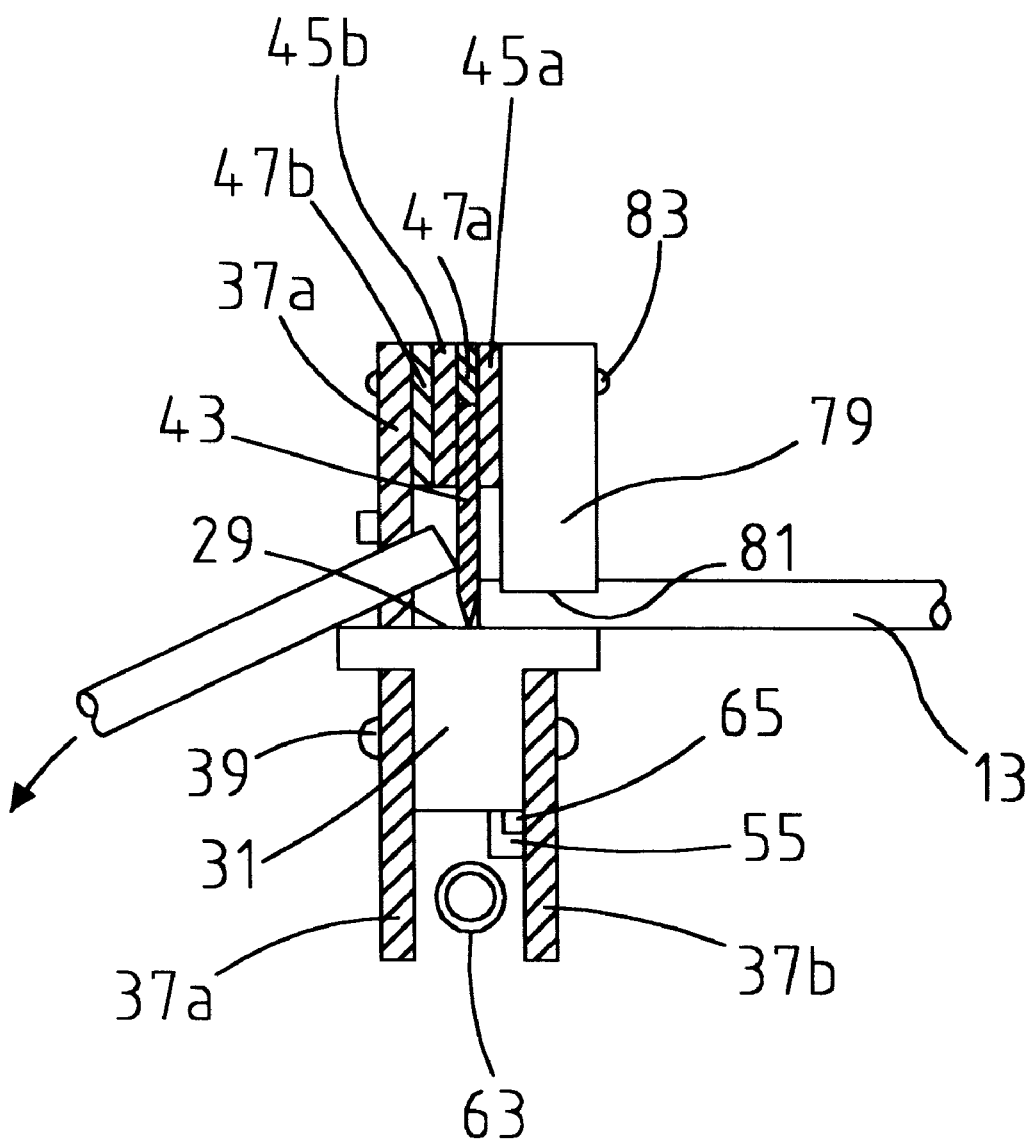
FIG. 6 is an end sectional view of the branch holder device of this invention taken along lines 6—6 in FIG. 5 after the cutting operation is completed.

Anvil 5 is shown in FIGS. 2 and 3 mounted in a first jaw 27 and comprises an anvil surface 29 and an anvil support projection 31 extending therebelow that is removably positionable in a slot, formed between first and second flat steel jaw plates 37a and 37b, and held therein by rivets 39, bolts, or the like. It is preferred that anvil support projection 31 is arranged orthogonal to anvil support surface 29 as shown in FIG. 3.

Cutting edge 7 is shown in FIGS. 1 through 4 to be formed along the straight edge 41 of a cutting blade 43 that is also preferably removably positionable between a pair of second jaws 45a and 45b, also formed from flat steel plate, held together by rivets 49, bolts, or the like. Spacer-shim means, comprising a center shim 47a, positioned behind and on top of cutting blade 43, and two side spacers 47b, positioned between secondjaws 45a and 45b and first and second jaw plates 37a and 37b, are provided to position cutting edge 7 rotatably and centrally along the centerline of anvil surface 29. Cutting blades 43 available for use in this invention are presently currently available as trapezoidal cutting blades for other type cutters and have positioning indentations 51 formed in them for use against mounting lugs 53 that may be formed in center shim 47a.

Second jaws 45a and 45b are arranged to jointly pivot about axial pin 9 lying orthogonal to the plane of second jaws 45a and 45b as shown in FIGS. 2 and 3. An arm 55 extends from second jaw 45a at an angle "α" to cutting edge 7 for connection to the actuation mechanism of this invention. A connector, such as an aperture 57, is formed at the far end of arm 55, remote from axial pin 9. For maximum mechanical advantage, angle "α" is made at least 90° to straight edge 7 and connector 57 is located at or near the end of arm 55.

As shown in FIG. 2, bias means 61 is located between connector 57 and a point 59 below anvil 5, preferably between plates 37a and 37b, and is preferably a coil spring 63 stretched therebetween to act as a return spring and maintain cutting edge 7 apart from anvil surface 29 and against a stop 65 formed in device 1 during all times in which the invention is not operated to cut a branch. Spring 63 thus maintains cutting edge 7 and anvil surface 29 in normally open arrangement as shown in FIG. 1 and in partially dotted outline in FIG. 2.

Lower jaw plates 37a and 37b are joined to shaft 21 preferably by rivets 67 as shown in FIGS. 1 and 2. Handle 17 is shown in FIG. 1 to include a pistol grip 69, also connected to shaft 21 by rivets 71. Multi-finger operated trigger 19, pivotally mounted by a pin 73 at or near the top of pistol grip 69, allows all of one's fingers on one hand grasping pistol grip 69 to pass around said trigger to squeeze together as a group to impart a substantial amount of squeezing power.

Means 25 is shown in FIG. 1 to be a non-stretchable yet flexible material such as a flexible stainless steel strap 75. Strap 75 is attached to trigger 19 below or apart from pin 73 so as to impart a substantial mechanical advantage to the strap when trigger 19 is squeezed against pistol grip 69. Shaft 21 is preferably a square, hollow shaft made of aluminum or steel and contains a hollow interior 77 through which strap 75 passes from trigger 19 to connector 57. Strap 75 is pulled by the squeezing of trigger 19 and overcomes the bias of means 61 so as to undergo tension and pivot cutting edge 7 about axial pin 9 and against anvil surface 29. Upon release of trigger 19, bias means 61 pulls strap 75 forward allowing cutting edge 7 to be pivoted about axial pin 9 in an upward direction to a position ready for cutting another branch.

The mechanical advantage of pistol grip 69, trigger 19, and attachment of strap 75 thereto is greater than 1.0 and preferably about 3.0. The mechanical advantage of strap 75 attached to connector 57 spaced-apart from axial pin 9 is also greater than 1.0 and preferably about 3.0. These mechanical advantages may be added together, since they both operate in the same direction, to provide a total mechanical advantage to cutting edge 7 against anvil 5 of 6.0 or greater. This means that invention 1 is strong enough to cut through branches whose thickness would not normally allow such cutting by a one-handed device. The path of movement of strap 75 is fore and aft along a single line shown by the arrows in FIG. 2. This is in contrast to the sweeping movements of prior art devices having two arms that constantly diverge from a common pivot axis. This means that by use of this invention only one penetration of flora need be made in cutting a branch and further that the power to operate the cutting jaws operates along a single line.

Figure 7:
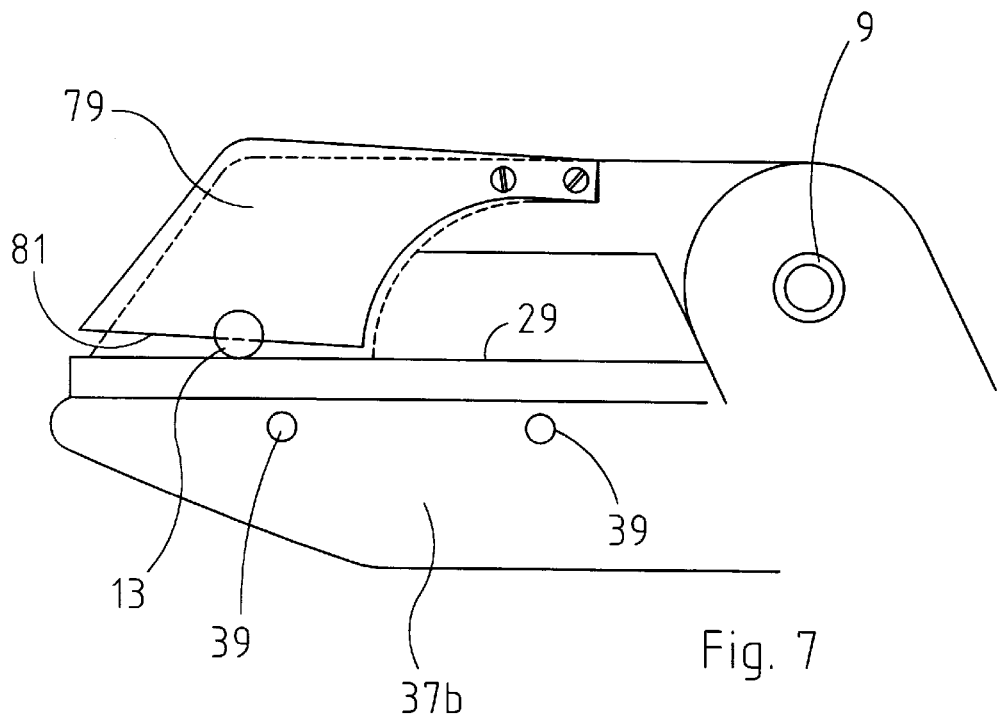
FIG. 7 is a close-up side view of another embodiment of the invention showing the pad flexing and pinching the slender article being cut to temporarily hold it in the device; and, FIG. 8 is another close-up side view of the same embodiment shown in FIG. 7 except the pad compresses about the slender article being cut to temporarily hold it in the device.
Figure 8:
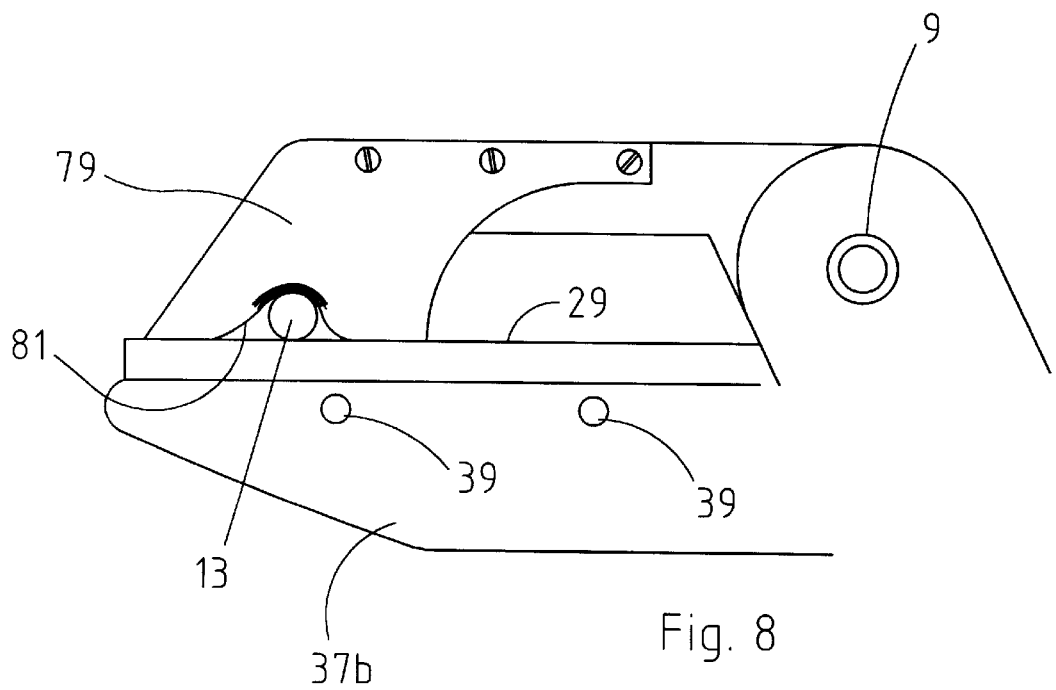

Another embodiment of the invention is shown in FIGS. 5 through 8 where means are provided to temporarily pinch and hold the cut-off portion of a limb in first end 3, following the cutting operation, so that the limb may be withdrawn from the bush or tree along with device 1 and thereafter released following the cutting operation. This is accomplished by mounting a pad 79 alongside second jaw 45b. Pad 79 is preferably made from plastic, has a finite thickness such as 3/16 inches, and is mounted to second jaw 45b with fasteners 83. Pad 79 extends downward to an edge 81 that terminates slightly above cutting edge 7. To insure that edge 81 does not interfere with the cutting operation, pad 79 is preferably mounted with fasteners 83 at the rear of and above cutting edge 7 thus allowing edge 81 to flex and pivot slightly upward during the cutting operation and move slightly above its neutral position as shown in dotted outline in FIG. 7. In another embodiment shown in FIG. 8, pad 79 may be made from slightly compressible material and mounted such that edge 81 will compress and deform slightly about branch 13 yet continue to pinch and hold the cut portion of the branch while device 1 is being withdrawn from the tree or bush. There should be sufficient strength in pad 79 to impart a substantial downward pressure through edge 81 on the branch portion that is cut off the bush or tree, as shown in FIGS. 7 and 8, to hold the cut end of the branch tightly against anvil surface 29 thus allowing the operator to withdraw device 1 by handle 17 and drag the cut branch from within the bush or tree.

While the invention has been described with reference to a particular embodiment thereof, those skilled in the art will be able to make various modifications to the described embodiment of the invention without departing from the true spirit and scope thereof It is intended that all combinations of elements and steps which perform substantially the same function in substantially the way to achieve substantially the same result are within the scope of this invention.

What is claimed is:

1. An elongated branch cutter powered by one hand, comprising:

a) a fixed anvil and a cutting edge articulated about an axis located at one end of said cutter and arranged in cutting orientation to close together from an open position to cut a branch positioned therebetween;

b) a single hand actuating handle including a pistol grip and a multi-finger-actuated trigger operably located at the other end of said cutter for causing said cutting edge to rotate into closed position against said anvil when said trigger is squeezed against said handle;

c) an elongated rigid shaft separating said anvil-cutting edge from said handle and said trigger; and, d) flexible, non-stretchable means extending between said cutting edge and said multi-finger-actuated trigger to undergo tension and pivot said cutting edge against said anvil upon squeezing said trigger;

e) a flat metal plate for holding said cutting edge; and, f) a pair of flat metal plates spaced on opposite sides of said anvil for mounting said anvil therebetween;

g) said shaft attached between said pair of metal plates and extending rearward thereof;

h) said single hand-actuating handle attached to said shaft at the other end thereof;

i) wherein said flexible, non-stretchable means extends between said anvil-cutting edge articulation and said multi-finger-actuated trigger, inside said shaft to pivot said cutting edge against said anvil upon squeezing said trigger.

2. A single hand-actuated device for cutting slender articles at a distance and temporarily holding one cut portion following the cutting operation, comprising:

a) a first end of said device including a fixedly mounted anvil, with anvil surface, and a cutting edge articulated about an axis in cutting orientation arranged to temporarily accept a slender article therebetween;

b) a second end of said device spaced-apart from said first end and including a handle and a multi-finger-actuated trigger in operable combination;

c) an elongated rigid shaft holding said first end remote from said second end;

d) means actuated at said second end and moveable along said shaft to undergo tension and cause said cutting edge to pivot forcibly into contact with said anvil surface at said first end to cut through the slender article; and, e) an edge mounted close to said cutting edge and arranged to come into contact with said slender article during the cutting operation to temporarily pinch and hold one cut portion of the slender article with said device following completion of said cutting operation.

3. The single hand-actuated device for cutting slender articles at a distance and temporarily holding one cut portion following the cutting operation of claim 2 wherein said edge is arranged to flex and pivot to hold one cut portion of the slender article against said anvil surface following completion of said cutting operation.

4. The single hand-actuated device for cutting slender articles at a distance and temporarily holding one cut portion following the cutting operation of claim 2 wherein said edge is arranged to compress and deform slightly about the slender article to hold one cut portion of the slender article against said anvil surface following completion of said cutting operation.

5. The single hand-actuated device for cutting slender articles at a distance and temporarily holding one cut portion following the cutting operation of claim 2 further including a pad arranged to partially compress upward from said anvil surface during the cutting operation for pinching the cut portion of the slender article against said anvil surface.

* * * * *